United States Patent [19]
Gazuit

[11] 3,971,694
[45] July 27, 1976

[54] MANUFACTURE OF RADIAL-CARCASS TIRES

[75] Inventor: Georges Gazuit, Montlucon, France

[73] Assignee: NRM Corporation, Akron, Ohio

[22] Filed: Apr. 2, 1975

[21] Appl. No.: 564,417

Related U.S. Application Data

[63] Continuation of Ser. No. 28,281, April 22, 1970, abandoned, which is a continuation of Ser. No. 617,658, Feb. 21, 1967, abandoned.

[30] Foreign Application Priority Data

Feb. 25, 1966 France .............................. 66.51107

[52] U.S. Cl. ................................. 156/415; 156/132; 156/400; 156/416
[51] Int. Cl.² ..................... B29H 17/14; B29H 17/26
[58] Field of Search ..................... 156/394, 400–402, 156/414, 415, 416–420, 132

[56] References Cited
UNITED STATES PATENTS

| | | |
|---|---|---|
| 3,184,361 | 5/1965 | Allitt .................................. 156/416 |
| 3,418,192 | 12/1968 | Nadler ................................ 156/417 |
| 3,433,695 | 3/1969 | Caretta et al. ...................... 156/415 |
| 3,485,692 | 12/1969 | Frazier ................................ 156/416 |
| 3,560,302 | 2/1971 | Missioux ............................. 156/416 |
| 3,607,558 | 9/1971 | Nebout ................................ 156/417 |
| 3,647,598 | 3/1972 | Gazuit ................................. 156/417 |
| 3,674,604 | 7/1972 | Gazuit ................................. 156/416 |
| 3,740,293 | 6/1973 | Jones et al. ......................... 156/418 |

Primary Examiner—William A. Powell
Assistant Examiner—John E. Kittle
Attorney, Agent, or Firm—Donnelly, Maky, Renner & Otto

[57] ABSTRACT

Drum for manufacturing radial-carcass tires, characterized in that it comprises means acting in synchronism for transforming a plane cylindrical surface, on which the rubber layers are laid together with the radial plies and the bead wires, into a toroidal surface by producing a geometrical preformation both in development and in section, and by a positive turning of the fabric and layers after shaping same.

47 Claims, 4 Drawing Figures

MANUFACTURE OF RADIAL-CARCASS TIRES

This is a continuation of application Ser. No. 28,281, filed Apr. 22, 1970, which in turn was a continuation of Ser. No. 617,658, filed Feb. 21, 1967, both abandoned.

This invention relates to the manufacture of radial-carcass tires and has specific reference to a drum for manufacturing tires of this type.

The precision necessary for manufacturing radial carcass tires requires a particular manufacturing procedure; up to now the tire was generally performed on a drum made of flexible material, thus precluding a purely geometrical preformation.

In section, a radial tire is characterized by the bead wire position and by the tread postion, forming together an isosceles trapezium. Therefore, during the preformation operation, the drum must necessarily reproduce geometrically this isosceles trapezium.

On the other hand, the density of the radial wires must remain constant during the preformation; this is possible only by resorting to a perfectly controlled development, that is, mechanical development.

To avoid any detrimental wire elongation some kind of servo-action must be established between the movement of the bead wires towards each other and the tire preformation. If $x$ is the value of this movement, and $y$ the preformation stroke, the relationship $x = f\, y$ must be obtained.

The geometrical-preformation tire manufacturing drum according to this invention meets these requirements, because;

1. The bead wires are defined and maintained in the proper position irrespective of the preformation.
2. The drum is cylindrically rigid.
3. The drum is rigid during the preformation. and the preformation development is a function of the movement of the bead wires towards each other.
4. The preformation is definitely geometrical both in development and in section.
5. The fabric is turned to its final position after having been shaped, that is, without any distorsion.
6. The turning of the tire takes place positively.
7. The drum is easily dismounted and extensible to permit the manufacture of several tire sizes.
8. It permits the manufacture of 1-ply 2-ply 2-0 or 2-ply 1-1 tires.
9. In its original form it permits the non-stop manufacture of tires.
10. In a simplified form, this manufacture may be carried out in two half-periods.

The device according to this invention comprises means for converting the cylindrical wall of the drum, by a mechanical development respecting the density and regularity of the radial wires, into a regular toroidal wall.

To this end, within a hollow shaft driving the drum there is rotatably mounted a screw formed with several threaded sections engaged by two series of internally-threaded or screw sockets or nuts controlling respectively the displacements of brackets sliding on said shaft and controlling crossed arms of equal length which support the preformation sectors, and the synchronous displacements of annular flanges supporting through the medium of bladders a system of metal sectors constituting the deformable structure supporting the tire wall.

The pitch of the two series of internally-threaded sockets meshing with said screw are so calculated that the value $x$ of the movement of the bead wires towards each other which is caused by the actuation of the external flanges is a function of the preformation stroke $y$ resulting from the displacement of the aforesaid crossed arms controlled by said sliding brackets.

The extensible metal sectors of the supporting structure, which vary in number according to the drum size, consist of flat springs forming a lower sheet having rivoted thereon an upper corrugated sheet consisting of spring elements secured at their ends to rods rigid with the control sector.

In its central portion said supporting structure carries cylindrical centering members fitting in the preformation sectors carried by the crossed arms responsive to said sliding brackets.

Coil springs are disposed circularly on the outer periphery of the central portion of said metal sectors.

The sheet formed by these coil springs is covered with an elastic layer or wall having its ends retained by the control sectors.

When the central control screw is rotated, the outer brackets and, therefore, the sectors engaged by the structure supporting the elastic wall, are moved symmetrically towards each other with respect to the drum axis, while the external sliding brackets develop radially, simultaneously and with the same amplitude the preformation sectors, until the structure assumes a continous toroidel configuration on the preformation sector.

The device for folding down the plies after the shaping operation comprises essentially flanged sleeves slidably mounted on the drum shaft and maintained at an adjustable relative spacing by screws so as to be carried along by the structure control flanges during their movement in relation to the preformation axis.

These flanges carry radial sectors adapted to expand when a suitably disposed air bladder is inflated, said radial sectors supporting peripheral springs adapted to act as support means for the tire bead.

Also secured to the flanges controlling the folding movement are pivoted plates hingedly mounted on a table and adapted to wrap the tire on the drum upon completion of the preformation operation. The rotation of the arms producing the folding or turning of the wall is controlled by means of a fluid-actuated cylinder acting upon bearing means.

Other features and advantages of the device constituting the subject-matter of this invention will be described more in detail hereinafter with reference to the accompanying drawings illustrating diagrammatically by way of example a typical form of embodiment of this invention and wherein.

Figure 1:
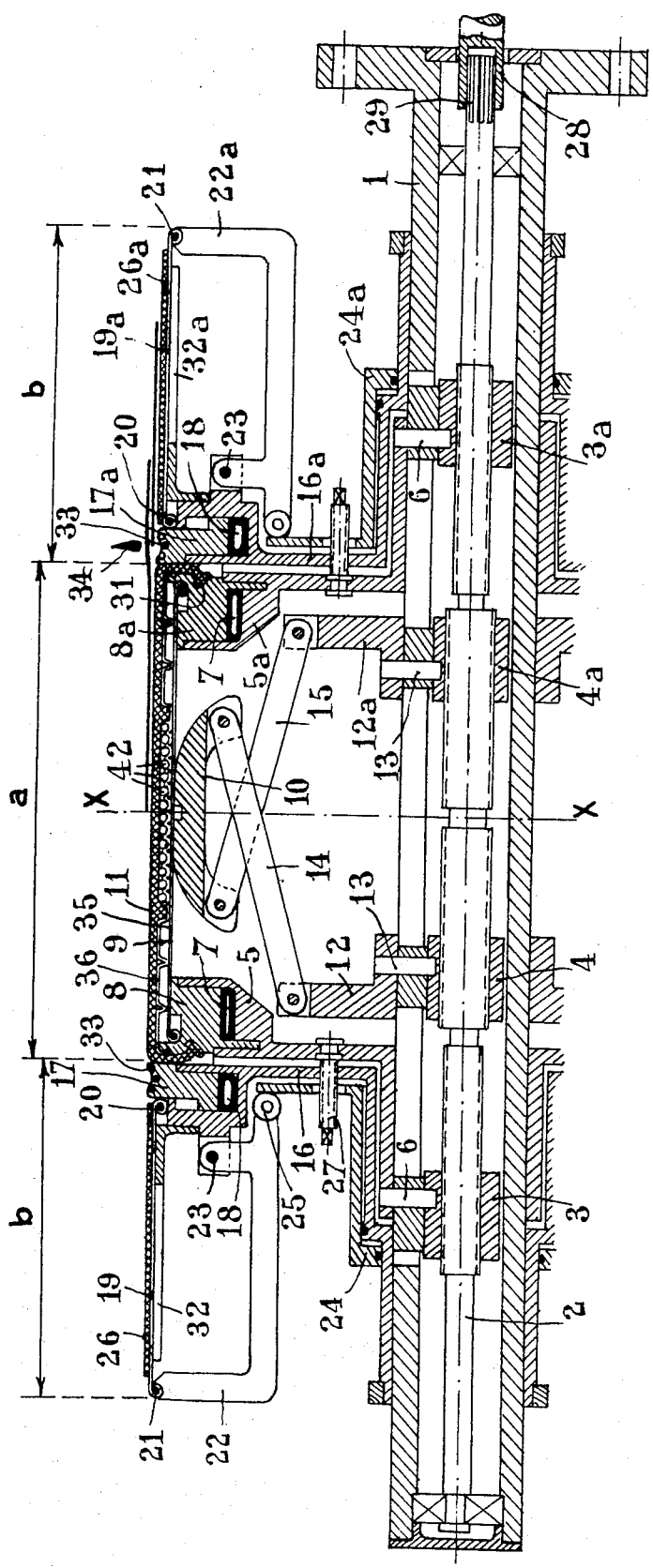
FIG. 1 is a diametral section of a half-drum.

The drum $a$ is mounted on a hollow shaft 1 secured by splined coupling 29 to the spindle 28 of the tire making machine, a screw shaft 2 consisting of several threaded sections being mounted within said hollow shaft 1 by means of suitable radial and axial bearings.

The splined coupling 20 at one end of screw 2 permits of rotatably driving this screw 2 and therefore the translation of four internally threaded sockets or nuts 3, 3a, 4, 4a. These sockets 3 and 3a, 4 and 4a are disposed symmetrically in relation to the preformation axis. The pitch of sockets 4 and 4a is in such ratio to the pitch of sockets 3 and 3a that the above-mentioned relationship $x = f y$ is obtained.

Having thus disclosed the shaft portion the drum will be divided into two separate sections, as follows, for a proper understanding of the disclosure:

a. the manufacturing and preformation drum (central portion)

b. device for folding the plies and side elements (lateral portions).

MANUFACTURING AND PREFORMATION DRUM

It comprises essentially two annular flanges 5 and 5a slidably mounted on the shaft 1 and respensive to the movements of screw sockets 3 and 3a through the medium of driving pins 6.

Figure 4:
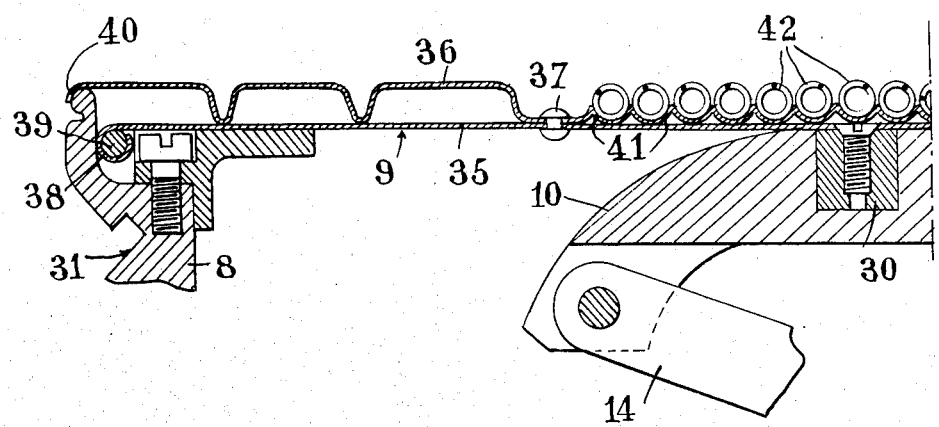
FIG. 4 is a view showing diagrammatically and on a larger scale various details of this structure.

These flanges 5 and 5a support in a suitable peripheral recess an inflatable air bladder 7 capable of giving two stable positions to the metal soctors 8 and 8a serving the purpose of supporting the carrier structure 35, 36. These metal sectors, of which the number varies as a function of the drum size, are adapted to move radially with a certain stroke controlled by said inflatable air bladder 7. Each sector 8 or 8a carries a flat spring 9 interconnecting these sectors 8 and 8a. This spring consists of heat-treated steel and has the shape shown in FIG. 4.

These springs 8 and 8a are rigid with a pair of main component elements 35 and 36 riveted with each other at points 37. Member 35 have hinge-shaped end portions 38 engageable by hinge pins 39 secured to the sector 8 or 8a. Intermediate its ends, the spring 35 has secured thereto a metal centering stud 30 atapted to fit in corresponding cavities of the preformation sector 10. The spring 36 has the contour illustrated with curved ends 40 adapted to fit on a projecting arm of sector 8 or 8a.

In the central portion of spring 36 a series of semi-circular cavities 41 are formed to permit the engagement therein of a series of coil springs 42 extending along the complete periphery of the drum.

This flexible and extensible metal structure 9, 35 and 36 is covered with an elastic and possibly reinforced layer 11 limiting the extension thereof and retained at its ends in a suitable recess 31 of sectors 6 and 8a.

The screw sockets 4 and 4a drive the brackets 12 and 12a by means of driving studs 13. These brackets 12 and 12a carry in the radial direction a series of crossed arms 14 and 15 having strictly the same length. These arms support at their outer ends the preformation sectors 10.

DRUM OPERATION

As the drum is cylindrical (see FIG. 4), the springs 9 constitute a homogeneous and perfectly rigid assembly since they are held at their central portions by the preformation sectors 10. The drum has a rigid and perfectly cylindrical shape.

When the screw 2 is rotated, the flanges 5 and 5a, and therefore the sectors 8 and 8a, are moved symmetrically towards each other with respect to the axis XX.

The same rotation of screw 2 causes the corresponding movements of the circular brackets 12, 12a so as to develop radially, simultaneously and with the same amplitude, the preformation sectors 10. The springs 9 then resume a curved configuration such that their developed length remains constant, until a continuous teroidal configuration is obtained at a predetermined maximum diameter.

The coil springs 42 constitute a peripherically continuous and definitely homogenous assembly, the elastic wall 11 imparting a smooth and continuous appearance thereto.

Thus, the top surface $\alpha$ formed by the assembly of coil springs 42 has a perfectly defined, rigid, smooth and strictly continuous shape. The same applies to the side walls of the drum.

In case of a manufacture requiring the provision of a shoulder across the bead of the tire, the sectors 8 and 8a are pushed by the bladder 7 to a diameter greater than the initial diameter. At this stage the preformation operation will take place as described hereinabove.

DEVICE FOR FOLDING THE PLIES AND SIDE ELEMENTS

Each assembly b comprises essentially a flange 16 in the form of an annular sleeve formed with a portion bent at right angles, slidably mounted on the shaft 1 and maintained at an adjustable mutual spacing by screws 27 so that it can be driven from the flange 8 when the latter is moved towards the preformation axis XX.

This flange 10 or 10a carries radial sectors 17, 17a adapted to be moved under the control of an inflatable air bladder 16. The series of sectors 17, 17a is completed by three peripheral springs 33 adapted to support the bead 34 of the tire, so that when the sectors 17, 17a are expanded by inflating said bladders 18 the tire beads 34 are strongly clamped by the peripheral springs 35.

Under these conditions the bead 34 of the tire follows exactly the movements of flanges 5 and 5a during the preformation operation.

Figure 2:
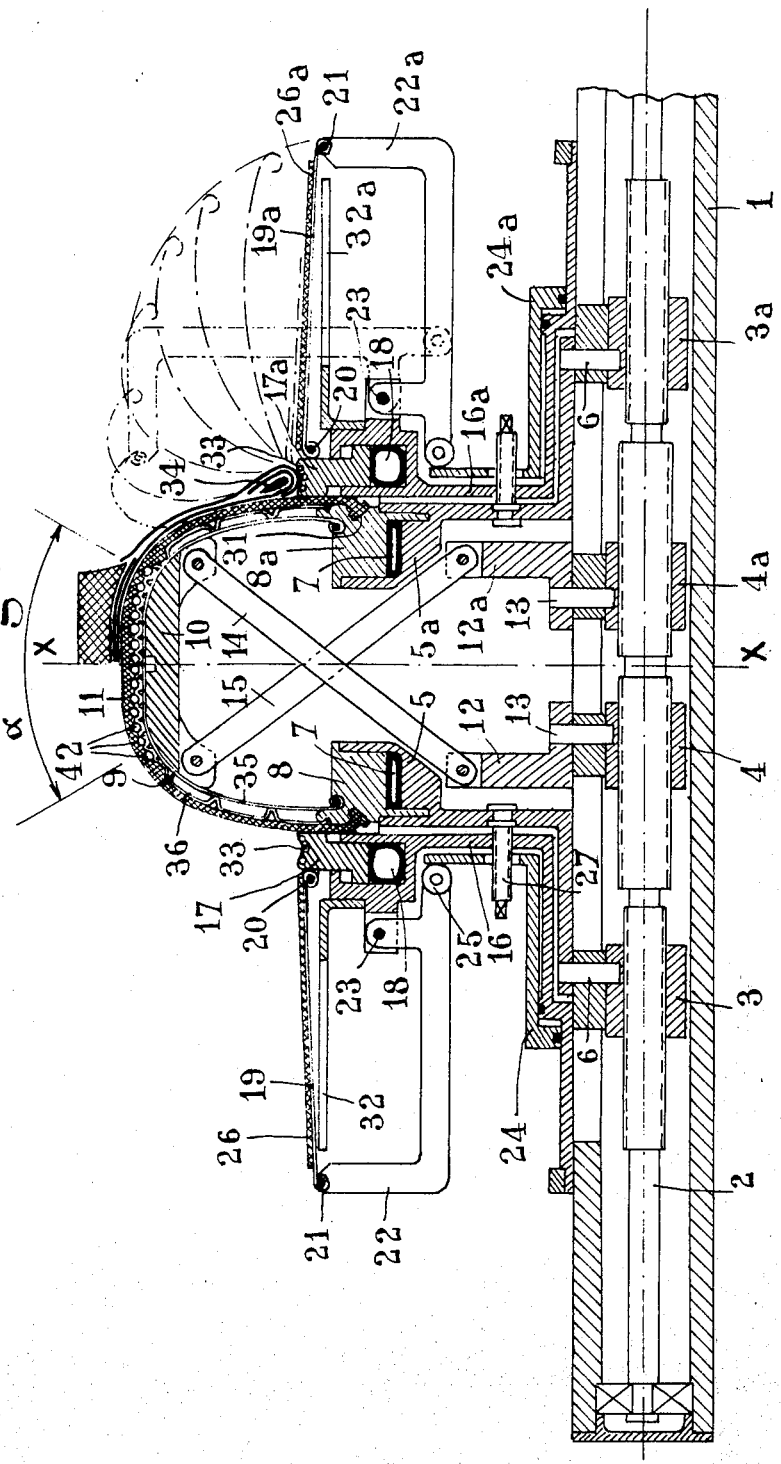
FIG. 2 is a similar view showing the half-drum after the preformation step and during the turning or folding of the plies and fabric layers.
Figure 3:
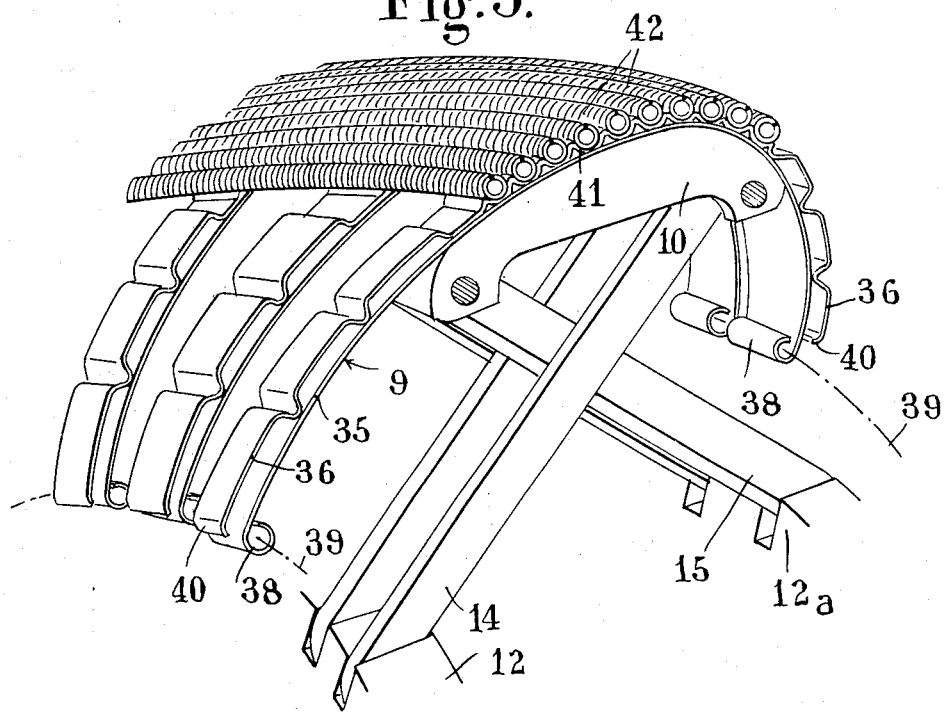
FIG. 3 is a perspective view showing the metal structure of the shaped drum, the elastic wall being removed therefrom.

A tray or table 32 or 32a is secured to the flange 16 or 16a. It is adapted to carry a series of flat springs 19, 19a. These springs are hingedly mounted about the point 20 on sectors 17 and 17a and at point 31, at the end of bent levers 23, 23a. These bent levers are each pivoted about a pin 23. Their pivotal movements are controlled by means of an actuator 24 or 24a, acting upon roller 25. This rotation of each bent lever 22, 22a is attended by a vertical enveloping movement of springs 12, 12a as shown in dash-and-dot lines in FIG. 2. The contineous connection between the springs 12 and 12a is obtained through an elastic sheet 26, 26a retained at one end on each spring 20.

The manufacture of a radial tire on this device is attended by the following steps:

1. The rubber sheets for the side walls are laid upon the folding springs 19, 19a.
2. The radial ply is laid upon the drum a.
3. The bend wires are laid upon the top of sectors 17, 17a.
4. The sectors 17 and 17a are clamped by inflating the air bladder 18.
5. Geometrical preformation by rotating the screw 2 and developing the preformation sectors 10, attended by the concomitant movements of springs 33 towards each other.

6. The breaker and the tread are laid.
7. The sidewall rubber and plies are turned about the two beads with a rolling movement.
8. The tire is removed.

What I claim is:
1. A tire building machine including a drum having a flexible surface adapted to be converted from a generally cylindrical to a toric shape, flange means forming the ends of said drum, said surface including flexible straps extending between said flange means, rigid sectors supporting the center of said straps internally, and means to move said flange means toward each other and said sectors radially outwardly in synchronized fashion to obtain such conversion.

2. A tire building machine as set forth in claim 1 including a central screw shaft drivingly connected to said rigid sectors.

3. A tire building machine as set forth in claim 2 including linkage means supporting each sector for radial movement, said screw shaft having four threaded sections, two operative to move said flanges toward and away from each other, and two operative to move the inner ends of said linkage means toward and away from each other and thus said sectors radially.

4. A tire building machine as set forth in claim 1 wherein each flange means includes radially movable sectors to which the flexible surface of said drum is secured, and means operative radially to expand and contract said segments.

5. A tire building machine as set forth in claim 4 including bead support rings at the ends of said drum and movable therewith, said rings comprising a plurality of radially movable segments.

6. A tire building machine as set forth in claim 5 including pivotally mounted spring means adjacent said bead support means operative to turn tire fabric about such bead rings and apply tire side wall material to said drum when in toric shape.

7. A tire building machine as set forth in claim 6 wherein said spring means is pivotally mounted at each end, and means operative to pivot the outer pivotal end of said spring means about an axis offset from the inner pivotal end to turn the tire fabric about the bead ring and apply tire side wall material to said drum.

8. A tire building machine as set forth in claim 1 including annular springs extending circumferentially of said drum supported on said straps to form a peripherally continuous substantially rigid surface supporting assembly on said drum regardless of its shape.

9. A tire building machine as set forth in claim 1 including an elastic covering on said drum connected at its ends to said flange means.

10. A tire building machine including a drum having a flexible surface adapted to be converted from a generally cylindrical to a tire shape, flange means forming the ends of said drum, said flexible surface extending axially between said flange means, rigid tire crown form sectors supporting said surface internally, and means to move said flanges inwardly and said sectors outwardly with the surface conforming to said sectors to form a drum of tire shape.

11. A tire building machine as set forth in claim 10 including drive means to move said flanges inwardly and said sectors radially.

12. A tire building machine as set forth in claim 11 including link means extending between said sectors and drive means for moving said sectors radially.

13. A tire building machine as set forth in claim 11 wherein said drive means comprises opposite hand screws on each side of the center of said drum and corresponding nuts thereon.

14. A tire building machine as set forth in claim 10 wherein said surface includes flexible straps connected to said sectors.

15. A tire building machine as set forth in claim 10 including circumferentially extensible springs.

16. A tire building machine as set forth in claim 13 wherein each nut supports the inner end of a link of said link means with the opposite end being connected to one of said sectors.

17. A tire building machine as set forth in claim 10 including metallic members extending axially inwardly from and pivoted to the ends of said drum underlying said flexible surface.

18. A tire building machine including a drum having a flexible surface adapted to be converted from a generally cylindrical to a toric shape, rigid support means for said surface in the center of said drum, first drive means operative to move the ends of said drum toward each other, and second drive means operative to move said support means radially outwardly in synchronized fashion with said first drive means to obtain positive controlled conversion.

19. A tire building machine as set forth in claim 18 wherein said rigid support means comprises a plurality of preformation sectors, and link means supporting said preformation sectors for such radial movement.

20. A tire building machine as set forth in claim 19 wherein the inner end of each of said link means is connected to a screw drive for moving said inner ends toward and away from each other symmetrically.

21. A tire building machine as set forth in claim 18 wherein said last mentioned means comprises a screw drive operative to move the ends of said drum axially symmetrically and said support means radially in a predetermined relationship.

22. A tire building machine as set forth in claim 18 wherein said flexible surface includes flexible metal straps extending between the ends of said drum, said rigid support means being connected to and centered with respect to said straps.

23. A tire building machine as set forth in claim 18 including metallic members extending axially inwardly from and pivoted to the ends of said drum underlying said flexible surface.

24. A tire building machine as set forth in claim 18 wherein said first and second drive means includes a central screw shaft having two threaded sections of the same pitch but opposite hand.

25. A tire building machine as set forth in claim 24 including nuts on said threaded sections held against rotation, the two nuts operating said support means being connected to said support means by levers.

26. A tire building machine as set forth in claim 25 wherein said rigid support means comprises a plurality of sectors, said levers being of equal length, each being pivoted to one end of each sector.

27. A tire building machine as set forth in claim 18 including means to expand radially the ends of said drum.

28. A tire building machine comprising a drum adapted to be converted from generally cylindrical to toroidal shape, said drum including a uniformly distensible flexible surface and a rigid support for said surface in both the generally cylindrical and toroidal conditions of said drum, said distensible flexible surface including a plurality of circumferentially extending extensible springs.

29. A tire building machine as set forth in claim 28 including an elastic flexible covering for said drum.

30. A tire building machine comprising a drum adapted to be converted from generally cylindrical to toroidal shape, said drum including a uniformly distensible flexible surface and a rigid support for said surface in both the generally cylindrical and toroidal conditions of said drum, said rigid support comprising a plurality of sectors, and means to move said sectors radially comprising levers of equal length, each being pivoted to one end of each sector.

31. A tire building machine including a drum having a flexible surface adapted to be converted from a generally cylindrical to a toric shape, rigid support means for said surface, drive means operative radially to expand said rigid support means as said drum is converted to toric shape uniformly circumferentially to distend said flexible surface, axially extending flexible members overlying said rigid support means, and circumferentially extensible spring means overlying said members.

32. A tire building machine as set forth in claim 31 including an elastic covering for said drum.

33. A tire building machine comprising a drum adapted to be converted from generally cylindrical to toroidal shape, said drum including a uniformly distensible flexible surface and a rigid internal support for said surface in both the generally cylindrical and toroidal conditions of said drum, said rigid support for said surface comprising a plurality of preformation sectors, means to move said sectors radially as said drum is converted from generally cylindrical to toroidal shape, and link means supporting said preformation sectors for such radial movement, the inner end of each of such link means being connected to a screw drive for moving the inner ends toward and away from each other symmetrically.

34. A tire building machine as set forth in claim 33 wherein said screw drive is also operative to move the ends of said drum axially symmetrically and said rigid support radially in a predetermined relationship.

35. A tire building machine including a drum having a flexible surface adapted to be converted from a generally cylindrical to a toric shape, rigid support means for said surface internally thereof, drive means operative radially to expand said rigid support means as said drum is converted to toric shape uniformly circumferentially to distend said flexible surface, said rigid support means including a plurality of tire crown shaped sectors movable radially beneath said surface to provide a rigid support in both conditions of conversion of said drum, and means to move the ends of said drum axially as said sectors are moved radially.

36. A tire building machine comprising a drum adapted to be converted from generally cylindrical to toroidal shape, said drum including a uniformly distensible flexible surface and a rigid internal support for said surface underlying and directly supporting said surface in both the generally cylindrical and toroidal conditions of said drum, and including flexible members extending inwardly from the ends of said drum, said rigid support being connected to and centered with respect to said members.

37. A tire building machine including a drum having a flexible surface adapted to be converted from a generally cylindrical to a toric shape, rigid support means underlying and supporting said surface in both the cylindrical and toric shape internally thereof, drive means operative radially to expand said rigid support means as said drum is converted to toric shape uniformly circumferentially to distend said flexible surface, and axially extending flexible members overlying said rigid support means.

38. A tire building machine including a drum having ends with a flexible cylindrical surface extending between said ends adapted to be converted from a generally cylindrical to tire shape, rigid tire crown form sectors supporting said surface centrally internally, a control shaft extending axially through said drum, and drive means interconnecting said control shaft and said sectors to move said sectors radially outwardly uniformly with the flexible surface conforming to said sectors as the drum ends move toward each other to form a drum of tire shape.

39. A tire building machine as set forth in claim 38 wherein said control shaft comprises a rotatable screw shaft having opposite hand threads symmetrically disposed on opposite sides of the center of the drum.

40. A tire building machine as set forth in claim 39 wherein said drive means further comprises two nuts symmetrically disposed, one on each screw thread, and drive links pivoted to said nuts and said sectors to move said sectors radially as said nuts move toward and away from each other upon rotation of said control shaft.

41. A tire building machine as set forth in claim 38 including drive means interconnecting the ends of said drum and said control shaft to move the ends of said drum toward and away from each other as said sectors are moved radially.

42. A tire building machine as set forth in claim 40 including drive means interconnecting the ends of said drum and said control shaft to move the ends of said drum toward and away from each other as said sectors are moved radially.

43. A tire building machine as set forth in claim 41 including bead support rings at the ends of the drum, and means to adjust the distance between said rings independently of said control shaft.

44. A tire building machine as set forth in claim 38 including means to expand and contract the ends of said drum.

45. A tire building machine as set forth in claim 38 including metallic members extending axially inwardly from and pivoted to the ends of said drum underlying said flexible surface.

46. A tire building machine as set forth in claim 30 including metallic members extending axially inwardly from and pivoted to the ends of said drum underlying said flexible surface.

47. A tire building machine as set forth in claim 33 including metallic members extending axially inwardly from and pivoted to the ends of said drum underlying said flexible surface.

* * * * *